(12) United States Patent
Kato et al.

(10) Patent No.: US 11,433,537 B2
(45) Date of Patent: Sep. 6, 2022

(54) AUTOMATIC PATH GENERATION DEVICE

(71) Applicant: FANUC Corporation, Yamanashi (JP)

(72) Inventors: Seigo Kato, Yamanashi (JP); Yoshiharu Nagatsuka, Yamanashi (JP); Yuuki Kimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 16/458,193

(22) Filed: Jul. 1, 2019

(65) Prior Publication Data

US 2020/0023516 A1    Jan. 23, 2020

(30) Foreign Application Priority Data

Jul. 17, 2018 (JP) .............................. JP2018-134515

(51) Int. Cl.
*B25J 9/16* (2006.01)
*G05B 19/425* (2006.01)

(52) U.S. Cl.
CPC ............. *B25J 9/1664* (2013.01); *B25J 9/163* (2013.01); *G05B 19/425* (2013.01)

(58) Field of Classification Search
CPC ......... G05B 19/425; G05B 2219/40477; B25J 9/1664; B25J 9/163
See application file for complete search history.

(56) References Cited

U.S. PATENT DOCUMENTS

| | | | |
|---|---|---|---|
| 6,836,702 B1* | 12/2004 | Brogårdh | B25J 9/1664 700/262 |
| 9,993,923 B2 | 6/2018 | Terada | |
| 2004/0254677 A1 | 12/2004 | Brogardh et al. | |
| 2009/0125146 A1* | 5/2009 | Zhang | G05B 19/423 700/253 |
| 2015/0094855 A1* | 4/2015 | Chemouny | B25J 9/163 901/3 |
| 2015/0165623 A1 | 6/2015 | Kange | |
| 2015/0217445 A1* | 8/2015 | Hietmann | B25J 9/0081 901/4 |
| 2015/0231785 A1* | 8/2015 | Suga | B25J 9/1671 700/250 |
| 2015/0239121 A1 | 8/2015 | Takeda | |
| 2017/0190052 A1* | 7/2017 | Jaekel | G06F 30/20 |
| 2018/0036882 A1 | 2/2018 | Kimura | |

(Continued)

FOREIGN PATENT DOCUMENTS

| | | |
|---|---|---|
| EP | 1631423 B1 | 9/2009 |
| EP | 3718707 A1 | 10/2020 |
| JP | H10291178 A | 11/1998 |

(Continued)

*Primary Examiner* — Stephen Holwerda
(74) *Attorney, Agent, or Firm* — Hauptman Ham, LLP

(57) ABSTRACT

An automatic path generation device includes a preprocessing unit creating teacher data based on a temporary motion path which is a motion path between a plurality of motion points where a robot moves and which is automatically generated with a motion planning algorithm and an actual motion path which is a motion path between the motion points and which is created by a skilled worker and a motion path learning unit generating a learned model which has learned a difference between the temporary motion path and the actual motion path with teacher data created by the preprocessing unit.

7 Claims, 8 Drawing Sheets

(56) References Cited

U.S. PATENT DOCUMENTS

2018/0222045 A1* 8/2018 Khansari Zadeh .... G06V 20/10
2018/0250827 A1  9/2018 Fujimoto et al.

FOREIGN PATENT DOCUMENTS

| JP | 2012157955 A | 8/2012 |
| JP | 2015160253 A | 9/2015 |
| JP | 2015160277 A | 9/2015 |
| JP | 201820410 A | 2/2018 |
| JP | WO2019107455 A1 | 11/2019 |
| WO | 2017/119088 A1 | 7/2017 |

* cited by examiner

AUTOMATIC PATH GENERATION DEVICE

RELATED APPLICATIONS

The present application claims priority to Japanese Patent Application Number 2018-134515 filed Jul. 17, 2018, the disclosure of which is hereby incorporated by reference herein in its entirety.

BACKGROUND OF THE INVENTION

1. Field of the Invention

The present disclosure relates to an automatic path generation device.

2. Description of the Related Art

The motion path at a time when a robot performing spot welding or arc welding moves (time series data indicating, for example, the coordinate value and the velocity of each axis of the robot determining a welding tool position or a welding tool posture) is generated by teaching from a worker. In some cases, the robot's motion path is automatically generated by a motion planning algorithm such as a rapidly exploring random tree (RRT) and based on given data indicating a hit point position on a workpiece and workpiece or jig shape data given as CAD data (for example, Re-publication of PCT International Publication No. 2017/119088 A1). Also present is an algorithm automatically generating a motion path based on a robot motion model.

Created in a case where the robot's movement path is automatically generated is, for example, a motion path for sequentially moving the robot to the hit point position where welding should be performed while avoiding the workpiece or a jig that hinders the robot's motion in the spot welding. In a case where the motion path is automatically generated, however, the robot's posture at the previous hit point position, the robot's efficient movement during workpiece or jig avoidance, and the load that is applied to the robot's axis (joint), and the like are not considered. A skilled worker manually teaches the robot a motion path in view of various such factors affecting the robot's efficient motion. The manual teaching, however, is burdensome on the worker's part. Besides, the manual teaching is time-consuming, and thus a problem arises in the form of an increase in cycle time. This problem arises in the other robots including handling robots as well as welding robots.

An object of the present disclosure is to provide an automatic path generation device automatically generating an efficient motion path for a robot motion.

SUMMARY OF THE INVENTION

An automatic path generation device of one embodiment of the present disclosure automatically generates a motion path (hereinafter, referred to as temporary motion path) based on the position of a motion point where a robot performs any motion (such as a hit point position in spot welding) and the shape of an interference object such as a workpiece and a jig and by means of a motion planning algorithm such as RRT. The automatic path generation device has a machine learning device. A skilled worker manually creates a motion path (hereinafter, referred to as actual motion path). The machine learning device learns the correlation between the temporary motion path and the actual motion path based on the actual motion path and the automatically generated motion path. Here, the motion path manually created by the skilled worker is a motion path that the skilled worker creates based on the position of a motion point and the shape of an interference object identical to the position of the motion point and the shape of the interference object that the motion planning algorithm uses in order to generate the motion path. The automatic path generation device estimates the actual motion path from the temporary motion path by using the machine learning device that has learned the correlation between the temporary motion path and the actual motion path. The temporary motion path is automatically generated by the motion planning algorithm and is not ideal as a motion path. The machine learning device learns the difference between the temporary motion path and the actual motion path and automatically estimates the actual motion path from the temporary motion path. As a result, the automatic path generation device is capable of automatically deriving an efficient motion path.

An aspect of the present disclosure relates to an automatic path generation device generating a motion path of a robot. The automatic path generation device includes a preprocessing unit creating teacher data based on a temporary motion path which is a motion path between a plurality of motion points where the robot moves and which is automatically generated with a motion planning algorithm and an actual motion path which is a motion path between the motion points and which is created by a skilled worker and a motion path learning unit generating a learned model which has learned a difference between the temporary motion path and the actual motion path with teacher data created by the preprocessing unit.

Another aspect of the present disclosure relates to an automatic path generation device generating a motion path of a robot. The automatic path generation device includes a learning model storage unit storing a learned model which has learned a difference between a temporary motion path which is a motion path between a plurality of motion points where the robot moves and which is automatically generated with a motion planning algorithm and an actual motion path which is a motion path between the motion points and which is created by a skilled worker and a motion path estimation unit estimating an actual motion path of the robot based on a temporary motion path of the robot automatically generated with a motion planning algorithm and a learned model stored in the learning model storage unit.

With the present disclosure, it is possible to automatically generate an efficient motion path of a robot in welding performed by means of the robot.

BRIEF DESCRIPTION OF THE DRAWINGS

The above and other objects and features of the present disclosure will become apparent from the following description of examples with reference to accompanying drawings, in which.

DETAILED DESCRIPTION OF THE PREFERRED EMBODIMENTS

Hereinafter, embodiments of the present disclosure will be described with reference to accompanying drawings. An automatic path generation device according to the present embodiment will be described below as a device generating a robot's motion path in spot welding. In this case, the position of the robot's motion point is, for example, a hit point position in the spot welding and interference objects include a workpiece and a jig.

Figure 1:
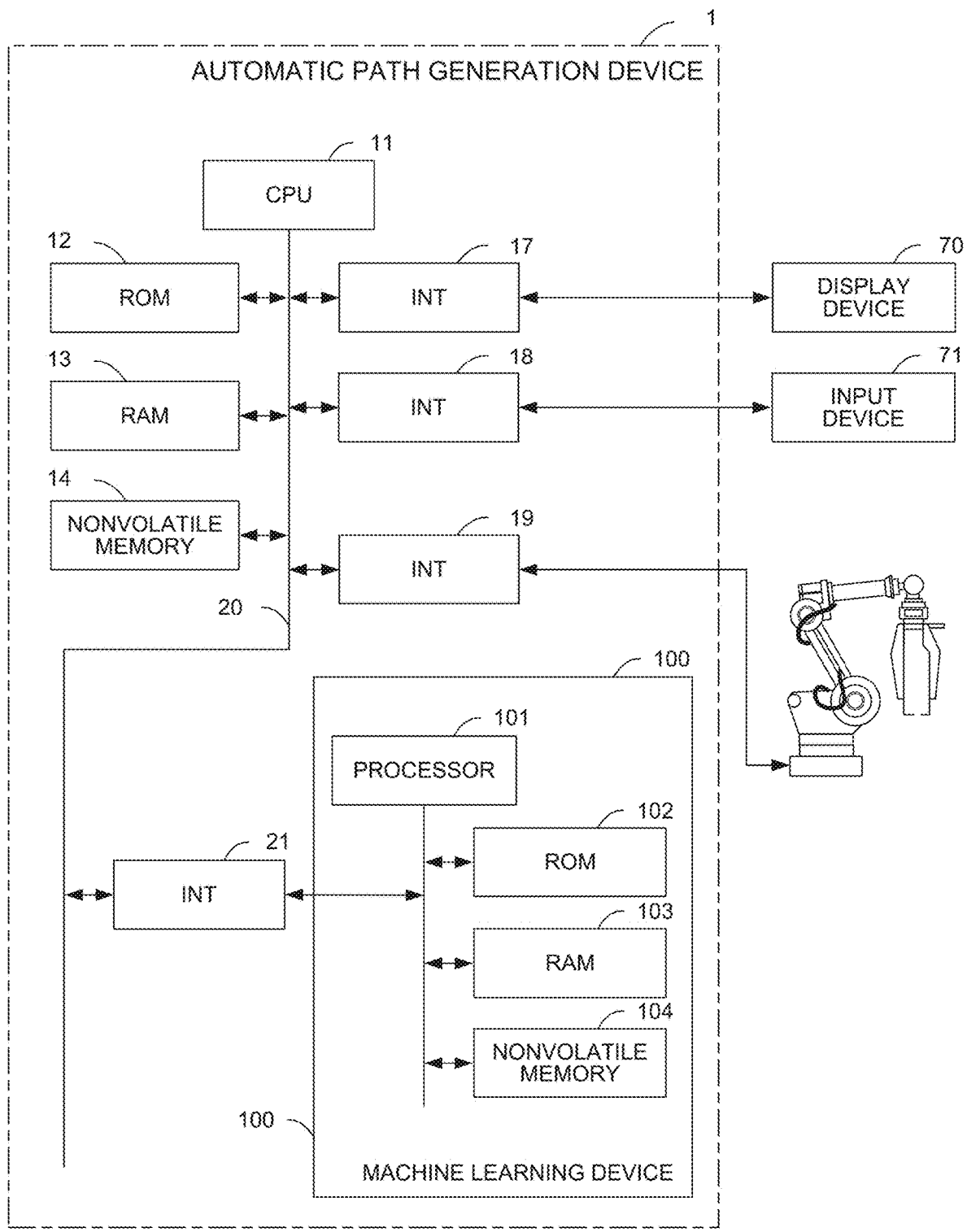
FIG. 1 is a schematic hardware configuration diagram of an automatic path generation device according to one embodiment.

FIG. 1 is a schematic hardware configuration diagram illustrating the automatic path generation device according to one embodiment. An automatic path generation device 1 is implemented in, for example, a controller controlling the robot. The automatic path generation device 1 is implemented in a personal computer put aside the robot and the robot controller, and a computer such as a cell computer, a host computer, an edge server, and a cloud server connected to the robot controller by means of a wired/wireless network. In the present embodiment, the automatic path generation device 1 is implemented in the controller controlling the robot.

The automatic path generation device 1 of the present embodiment has a function used for general robot control. The automatic path generation device 1 is connected to a robot 2 via an interface 19 and controls the robot 2. The robot 2 has at least one link (movable portion) and at least one joint. The robot 2 is, for example, a six-axis articulated type robot. The robot 2 includes a tool such as a C gun, an X gun, and a laser for performing welding such as spot welding, arc welding, and laser welding. The robot 2 may grip the workpiece and weld the workpiece by changing the position of the gripped workpiece with respect to the welding tool fixed at a predetermined position.

The automatic path generation device 1 includes a machine learning device 100 in which the motion path of the robot 2 during the welding is machine-learned in advance. The automatic path generation device 1 controls the robot 2 and performs the workpiece welding in accordance with the result of estimation of the optimum motion path of the robot 2 output from the machine learning device 100 based on the result of the machine learning. The detailed configuration of the robot 2 is already known, and thus will not be described in detail in the present specification.

A CPU 11 of the automatic path generation device 1 is a processor controlling the automatic path generation device 1 as a whole. The CPU 11 reads the system program that is stored in a ROM 12 via a bus 20. The CPU 11 controls the entire automatic path generation device 1 in accordance with the read system program. A RAM 13 temporarily stores temporary calculation and display data, various data input by a worker via an input device 71, and the like.

A memory, an SSD, or the like backed up by a battery (not illustrated) constitutes a nonvolatile memory 14. Accordingly, the storage state of the nonvolatile memory 14 is maintained even after the automatic path generation device 1 is turned off. The nonvolatile memory 14 has a setting area in which setting information related to the operation of the automatic path generation device 1 is stored. The nonvolatile memory 14 stores, for example, CAD data or a control program for the robot 2 input from the input device 71 and CAD data or a control program for the robot 2 read from an external storage device (not illustrated). The program and various data stored in the nonvolatile memory 14 may be loaded in the RAM 13 during execution/use. Various system programs (including a system program for controlling communication with the machine learning device 100 (described later)) such as a known analysis program are pre-written in the ROM 12.

A display device 70 displays, for example, each data read into the memory and data obtained as a result of program execution. Data and the like output from the machine learning device 100 (described later) are input to the display device 70 via an interface 17 and displayed by the display device 70. A keyboard, a pointing device, and the like constitute the input device 71. The input device 71 receives data, a command, and the like based on an operation conducted by the worker and delivers the data, the command, and the like to the CPU 11 via an interface 18.

An interface 21 is an interface for connecting the machine learning device 100 with each unit of the automatic path generation device 1. The machine learning device 100 includes a processor 101 controlling the machine learning device 100 as a whole and a ROM 102 storing a system program and the like. The machine learning device 100 further includes a RAM 103 for performing temporary storage in each processing related to machine learning and a nonvolatile memory 104 used for a learning model or the like to be stored. The machine learning device 100 observes each piece of information (such as the room temperature that is set via the input device 71 and the state quantity of each motor that is acquired from the robot 2) that can be acquired by the automatic path generation device 1 via the interface 21. Each unit of the automatic path generation device 1 acquires a processing result from the machine learning device 100 via the interface 21.

Figure 2:
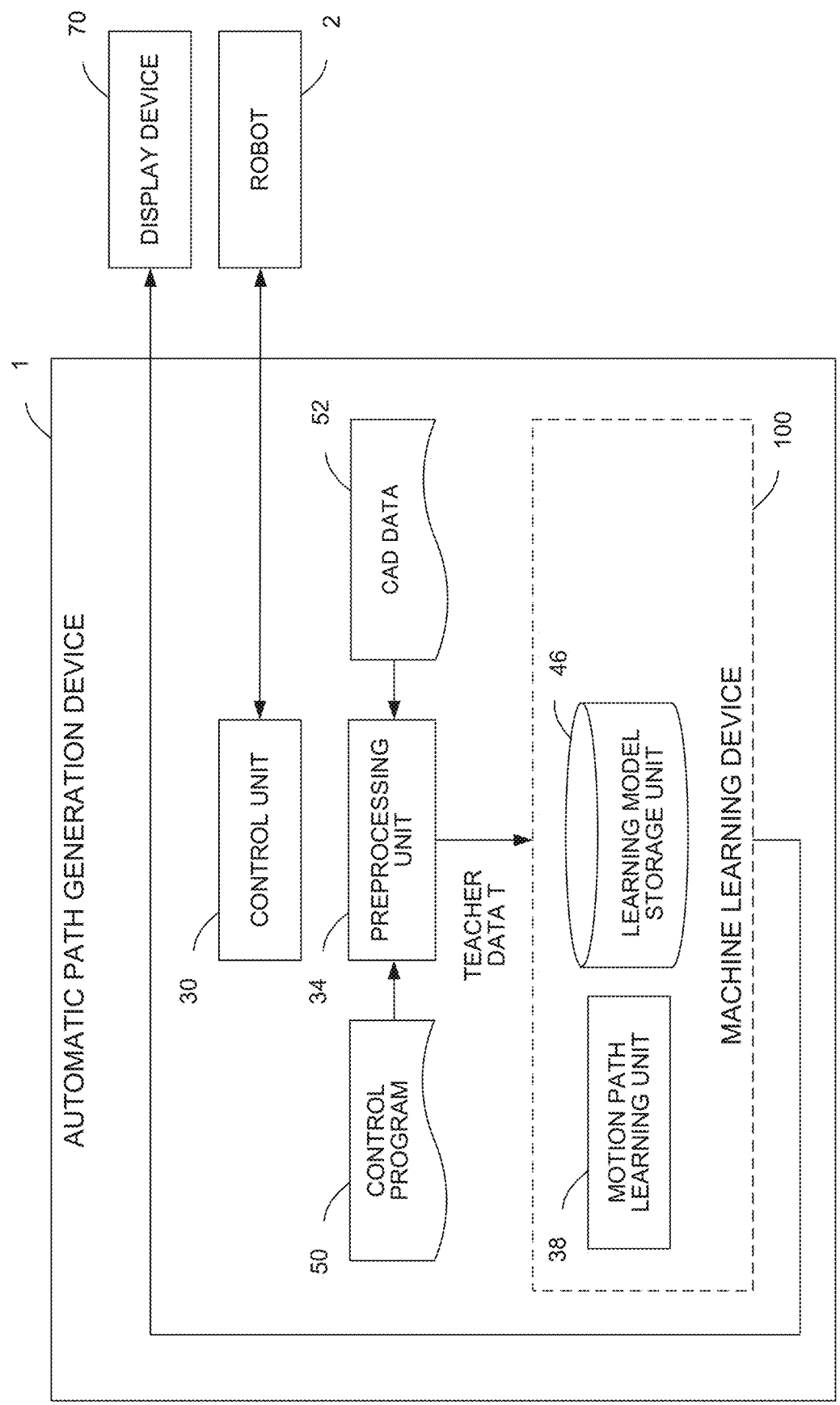
FIG. 2 is a schematic functional block diagram of an automatic path generation device according to a first embodiment.

FIG. 2 is a schematic functional block diagram in the learning mode of the machine learning device 100 of the automatic path generation device 1 according to a first embodiment. The function of each functional block illustrated in FIG. 2 is realized by the CPU 11 of the automatic path generation device 1 illustrated in FIG. 1 and the processor 101 of the machine learning device 100 executing the respective system programs of the CPU 11 and the processor 101 and controlling the operation of each unit of the automatic path generation device 1 and the machine learning device 100.

The automatic path generation device 1 includes a control unit 30, a preprocessing unit 34, and a motion path learning unit 38. The control unit 30 controls the robot 2. The preprocessing unit 34 creates teacher data used for the machine learning that is executed by the machine learning device 100. The teacher data is created based on a control program 50 including information indicating a motion path created by teaching from the worker and CAD data 52 including shape information on the workpiece and the jig to be welded. The motion path learning unit 38 learns the motion path of the robot 2 by using the teacher data created by the preprocessing unit 34.

The control unit 30 controls the robot 2 based on the control operation that the worker performs on an operation board (not illustrated), the control program that is stored in the nonvolatile memory 14 or the like, the motion path that is output from the machine learning device 100, or the like. The control unit 30 has a function for general control required for each unit of the robot 2 to be controlled. In a case where each axis (joint) of the robot 2 is moved, for example, the control unit 30 outputs command data indicating the amount of change in axis angle for each control cycle to the motor that drives the axis. The control unit 30 acquires the motor state quantities (such as the current value, the position, the velocity, the acceleration, and the torque) of each motor of the robot 2 and uses the acquired motor state quantities in controlling the robot 2.

The preprocessing unit 34 is functional means for creating teacher data T used for supervised learning, which is a machine learning method, based on the control program 50 and the CAD data 52 and outputting the teacher data T to the machine learning device 100. The control program 50 includes information indicating a motion path created by teaching from a skilled worker. The CAD data 52 includes the shape information on the workpiece and the jig to be welded. The preprocessing unit 34 calculates the motion path of the robot 2 (hereinafter, referred to as temporary motion path) by using a known motion planning algorithm (such as an RRT) and based on the spot welding hit point position information extracted from the control program 50 and the workpiece and jig position information included in the CAD data 52. The preprocessing unit 34 creates the teacher data and outputs the teacher data to the machine learning device. In the teacher data, data related to the calculated motion path is input data and output data is data related to the motion path extracted from the control program 50 and created by teaching from the worker (hereinafter, referred to as actual motion path). Each of the temporary motion path and the actual motion path is, for example, hit point-related information, information related to an inter-hit point midpoint, and time series data on the operation parameters of the robot 2 between the hit point and the midpoint. The motion parameters are, for example, time series data on the motion parameters indicating the velocity, the acceleration, the smoothness, and the like of each axis. Each of the temporary motion path and the actual motion path is hit point-related information, information related to an inter-hit point midpoint, and time series data on the motion parameters of the tool gripped by the robot 2 between the hit point and the midpoint. The motion parameters in this case may be, for example, time series data on the motion parameters indicating, for example, the velocity, the acceleration, and the smoothness of the position of the tool gripped by the robot 2.

Figure 3:
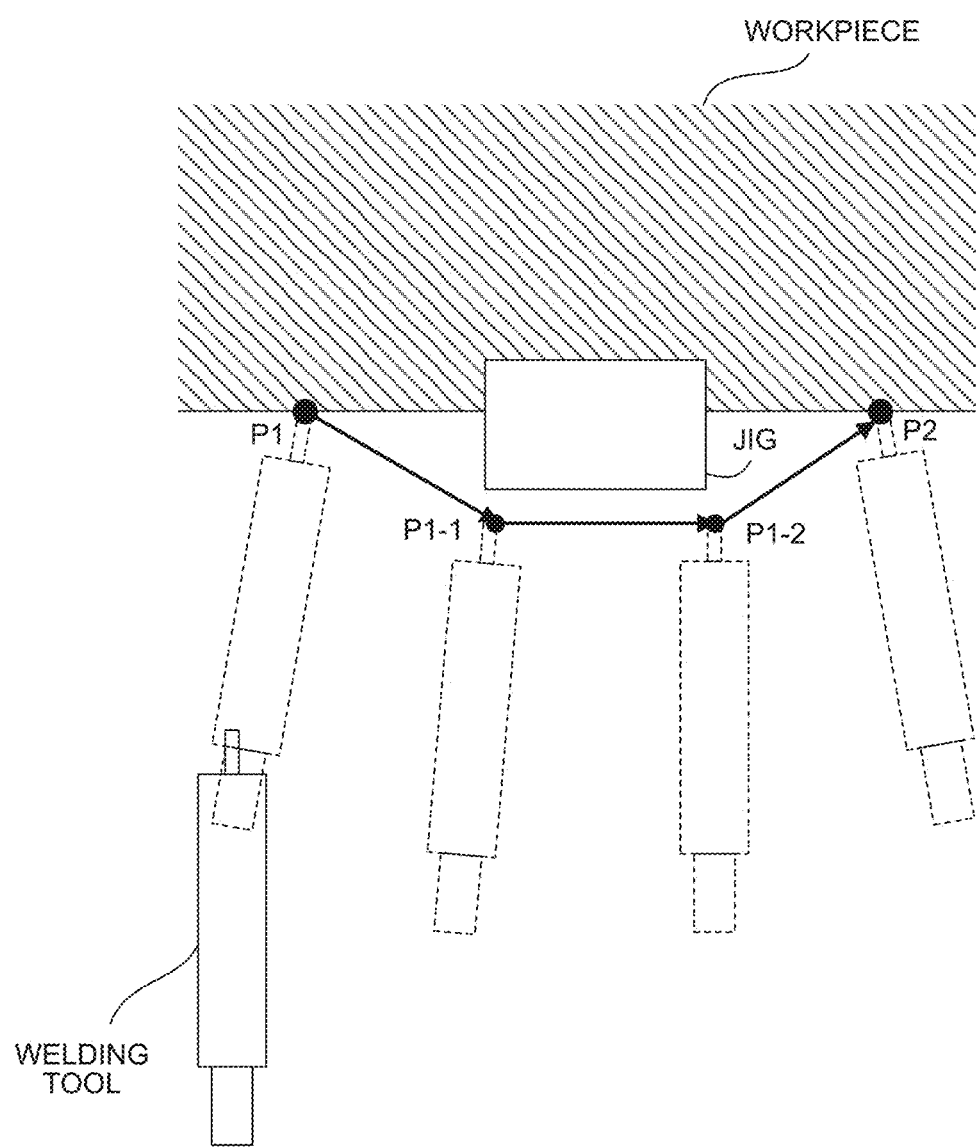
FIG. 3 is a diagram exemplifying a robot motion path.

FIG. 3 is a diagram illustrating an example of the motion path for moving between the hit point positions of the workpiece. In FIG. 3, the welding tool is attached to the hand of the robot 2. The welding tool performs welding on hit point positions P1 and P2 of the workpiece under the control of the control unit 30. When the welding tool is moved from the hit point position P1 to the hit point position P2, a motion path that does not interfere with the jig needs to be generated. FIG. 3 illustrates a motion path in which the welding tool sequentially moves to the hit point position P1, a midpoint P1-1, a midpoint P1-2, and the hit point position P2. In a case where each axis of the robot 2 moves in accordance with the three motion parameters of velocity, acceleration, and smoothness (in position) during the movement between the respective hit point and midpoint positions, the motion path from the hit point position P1 to the hit point position P2 is defined by the position of each axis of the robot 2 (or the position of the tool) at each hit point and midpoint position, the velocity, the acceleration, and the smoothness of each axis during the movement from the hit point position P1 to the midpoint P1-1, the velocity, the acceleration, and the smoothness of each axis during the movement from the midpoint P1-1 to the midpoint P1-2, and the velocity, the acceleration, and the smoothness of each axis during the movement from the midpoint P1-2 to the hit point position P1-2. Such time series data is created with regard to the temporary motion path and the actual motion path. The teacher data T is created by the temporary motion path being used as input data and the actual motion path being used as output data.

The preprocessing unit 34 may create the single teacher data T from the entire motion path (temporary and actual motion paths) of the robot 2. The preprocessing unit 34 may create single teacher data Ti from the partial motion path between two hit point positions Pi and Pj in the entire motion path (temporary and actual motion paths) and create a plurality of teacher data T1 to Tn (n being a positive integer) respectively corresponding to the partial motion path from the entire motion path of the robot 2. The preprocessing unit 34 may create teacher data as follows. The preprocessing unit 34 creates teacher data Tj in which the partial motion path between four hit point positions Pi to P1 in the entire temporary motion path is single input data and the partial motion path between Pj and Pk in the actual motion path is single output data corresponding to the input data. The preprocessing unit 34 creates the plurality of teacher data T1 to Tn (n being a positive integer) respectively corresponding to the partial motion path from the entire motion path of the robot 2 (In a case where the teacher data is created in this manner, a predetermined fixed value such as 0 may be defined for partial input data that cannot be defined from the temporary motion path at the movement initiation and termination positions of the robot 2). As described above, the teacher data may be appropriately set in accordance with how the learning model is defined.

The motion path learning unit 38 is functional means for performing supervised learning using the teacher data created by the preprocessing unit 34 and generating (learning) a learned model used for estimating the actual motion path from the temporary motion path. The motion path learning unit 38 may use, for example, a neural network as a learning model. In this case, the motion path learning unit 38 performs supervised learning in which data related to the temporary motion path included in the teacher data created by the preprocessing unit 34 is input data and data related to the actual motion path is output data. A neural network provided with the three layers of an input layer, an intermediate layer, and an output layer may be used as the learning model. A so-called deep learning method using a neural network of three or more layers may be used as the learning model. Effective learning and inference are performed as a result.

The learning that is conducted by the motion path learning unit 38 is performed in a case where the automatic path generation device 1 functions as a learning mode. In the learning mode, the automatic path generation device 1 acquires various control programs 50 and CAD data 52 via an external device such as a USB device (not illustrated) or a wired/wireless network (not illustrated). The automatic path generation device 1 performs learning based on the various acquired control programs 50 and CAD data 52. The automatic path generation device 1 generates the learned model for estimating the actual motion path from the temporary motion path. Then, the learned model generated by the motion path learning unit 38 is stored in a learning model storage unit 46 provided on the nonvolatile memory 104. The learned model is used for the estimation of the actual motion path by a motion path estimation unit 40 (described later).

The automatic path generation device 1 configured as described above generates, based on the control program 50 and the CAD data 52, the learned model that has learned the actual motion path (motion path created by teaching from the skilled worker) corresponding to the temporary motion path (motion path automatically created by the motion planning algorithm or the like). The control program 50 includes information indicating the motion path created by teaching from the skilled worker. The CAD data includes the shape information on the workpiece and the jig to be welded.

Figure 4:
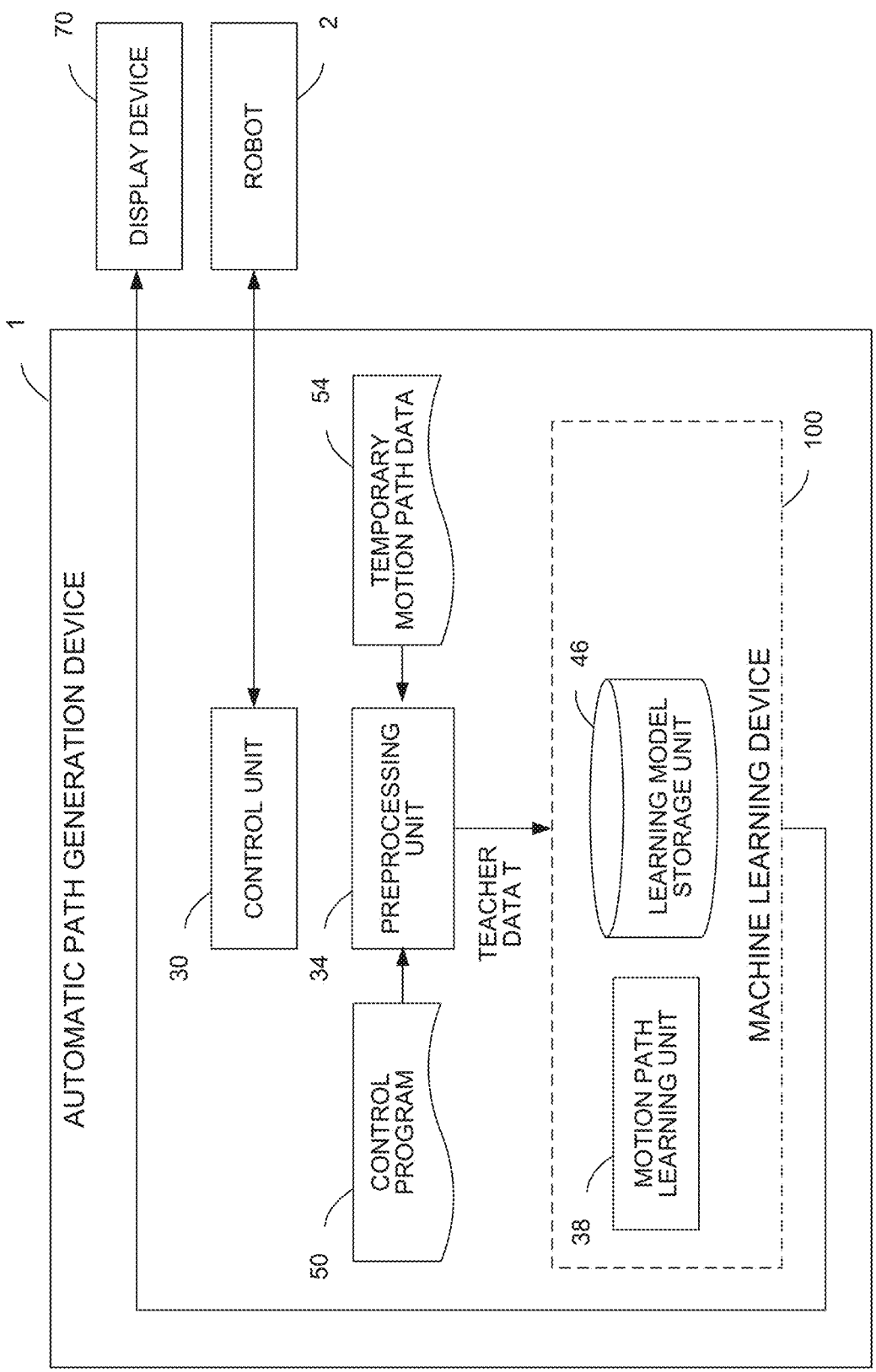
FIG. 4 is a schematic functional block diagram of an automatic path generation device according to another modification example.

A modification example of the automatic path generation device 1 of the present embodiment is illustrated in FIG. 4. The preprocessing unit 34 creates the teacher data T based on the control program 50 including the motion path created by teaching from the skilled worker and a temporary motion path data 54 including a motion path automatically created by a motion path algorithm or the like and outputs the teacher data T to the machine learning device 100. In this case, the worker creates the temporary motion path data 54 based on the hit point position and the CAD data by using an external device or the like and the created temporary motion path data 54 is read by the automatic path generation device 1 along with the control program 50. Generated as a result is the learned model that has learned the actual motion path (motion path created by teaching from the skilled worker) corresponding to the temporary motion path (motion path automatically created by the motion planning algorithm or the like).

Figure 5:
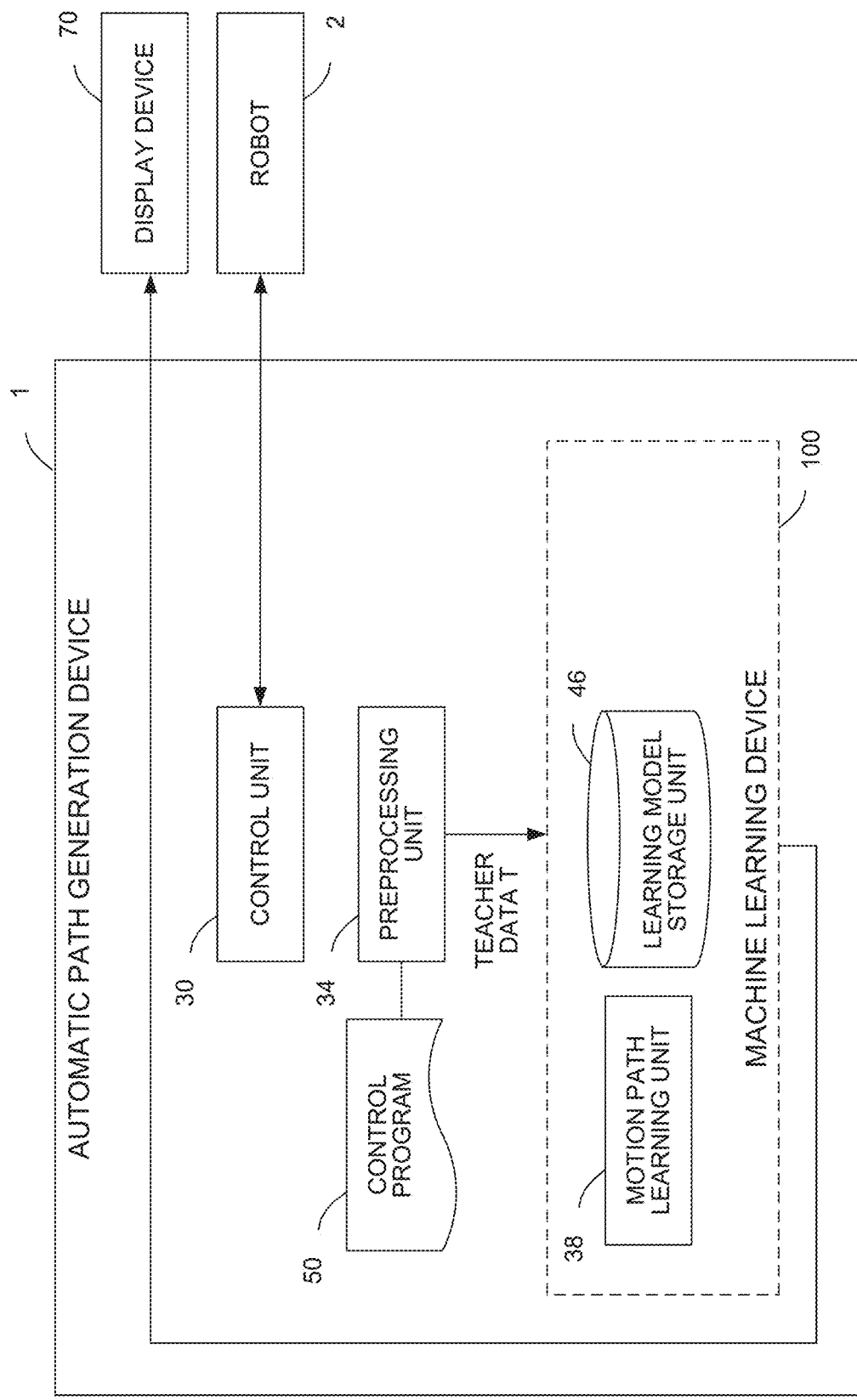
FIG. 5 is a schematic functional block diagram of an automatic path generation device according to another modification example.
Figure 6:
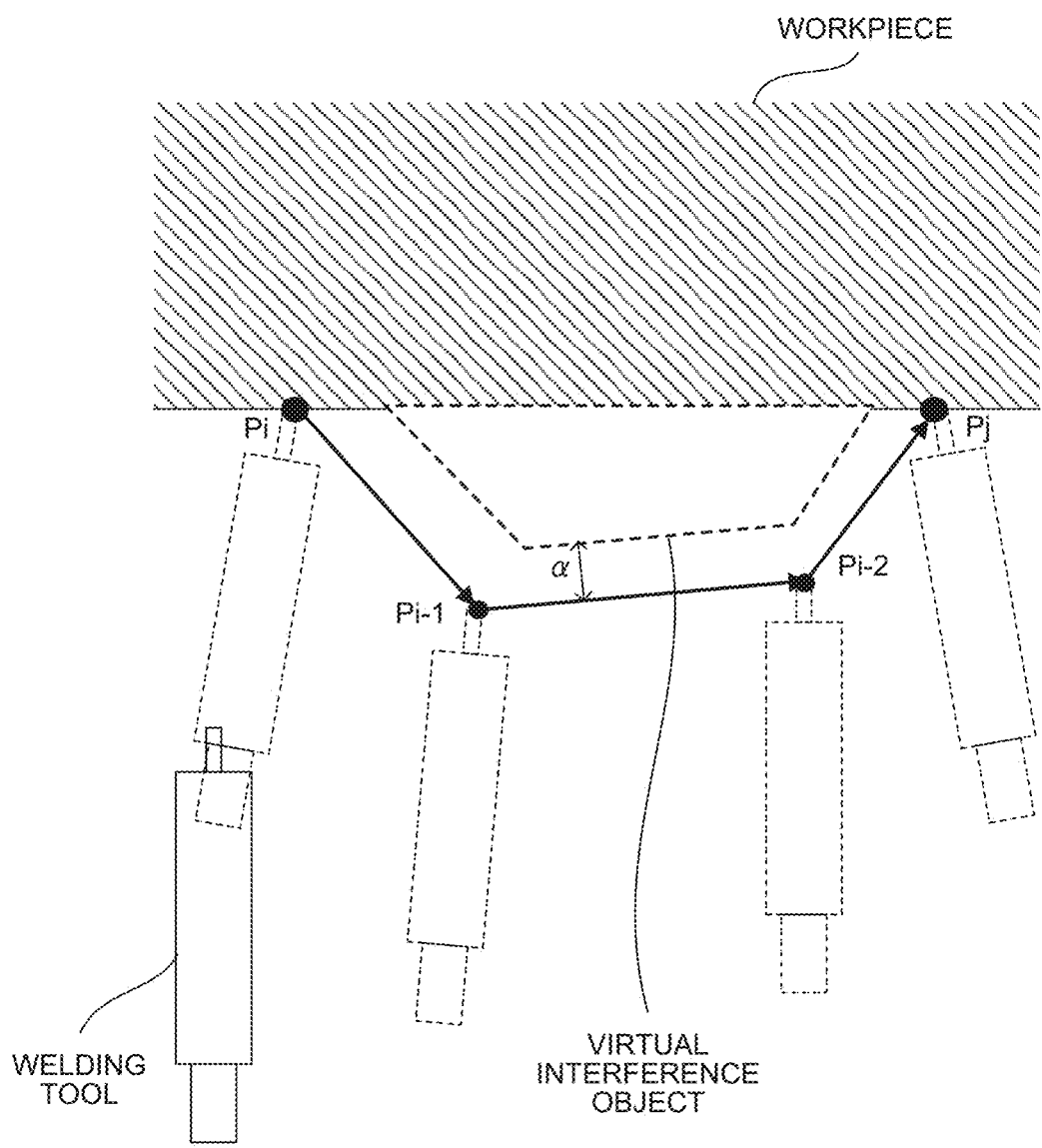
FIG. 6 is a diagram exemplifying a robot motion path from an actual motion path.

Another modification example of the automatic path generation device 1 of the present embodiment is illustrated in FIG. 5. The preprocessing unit 34 creates the teacher data T based on the control program 50 including the motion path created by teaching from the skilled worker and outputs the teacher data T to the machine learning device 100. As exemplified in FIG. 6, the preprocessing unit 34 in this case analyzes the actual motion path extracted from the control program 50 and created by teaching from the skilled worker. In a case where the path between the hit point position Pi and the hit point position Pj in the actual motion path is a bypass path (that is, in a case where the path is not a substantially straight line), the preprocessing unit 34 assumes that a virtual interference object is present at the position of an (preset) inside distance a of the motion path. The preprocessing unit 34 calculates the temporary motion path of the robot 2 by using a known motion planning algorithm (such as an RRT) in view of the assumed virtual interference object. The teacher data T is created in which the temporary motion path obtained as described above and the actual motion path are input data and output data, respectively. The teacher data T is output to the machine learning device 100. The preprocessing unit 34 may be configured as a machine learner that has learned the temporary motion path corresponding to the actual motion path. In this case, the preprocessing unit 34 estimates the temporary motion path based on the actual motion path extracted from the control program 50. The preprocessing unit 34 creates teacher data in which the estimated temporary motion path is input data and outputs the teacher data to the machine learning device 100. With this configuration, it is possible to generate the learned model that has learned the actual motion path (motion path created by teaching from the skilled worker) corresponding to the temporary motion path (motion path automatically created by the motion planning algorithm or the like) is learned even in a case where only the control program 50 is present with the CAD data 52 absent.

Figure 7:
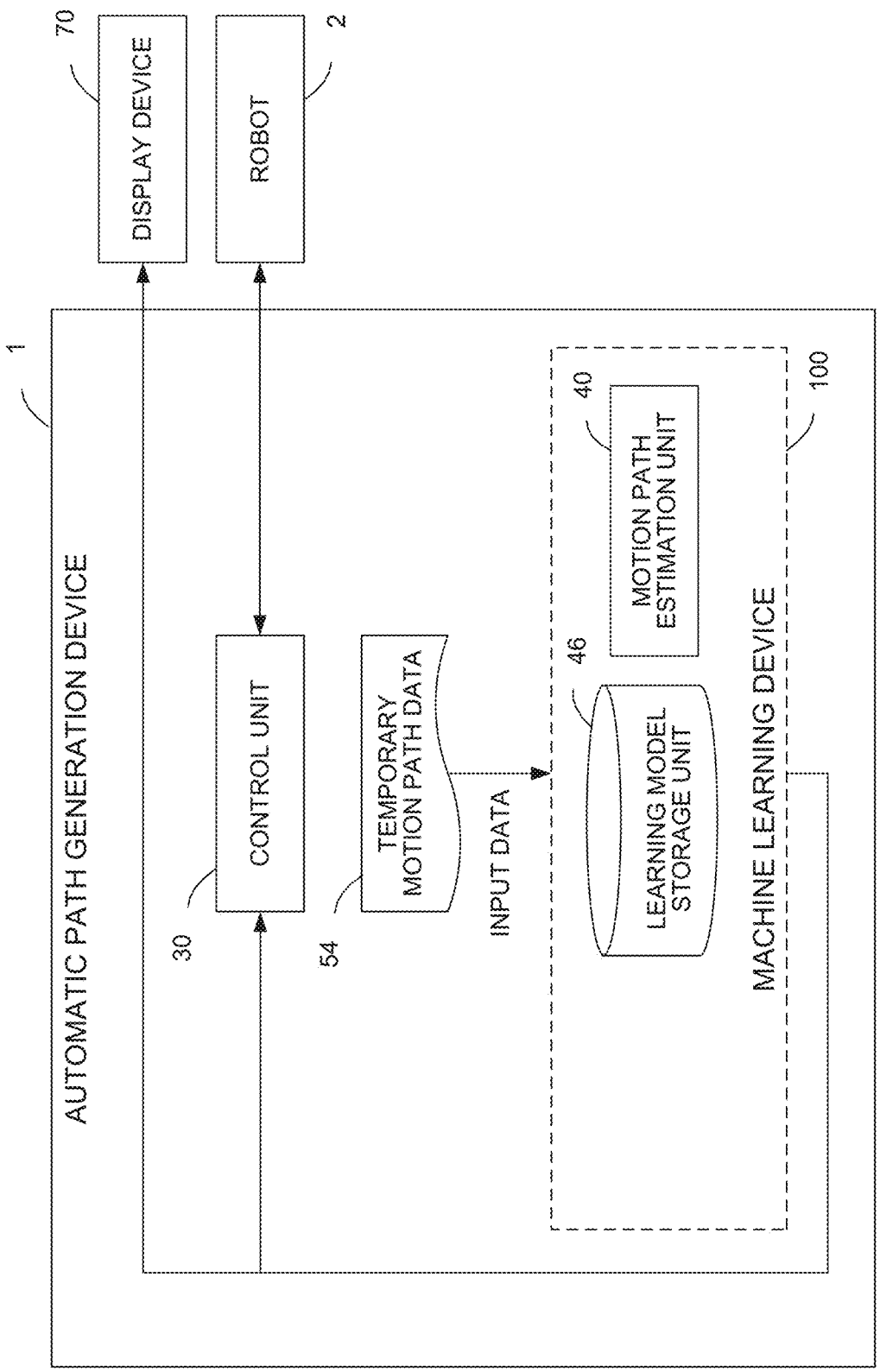
FIG. 7 is a schematic functional block diagram of an automatic path generation device according to a second embodiment.

FIG. 7 is a schematic functional block diagram in the estimation mode of the machine learning device 100 of the automatic path generation device 1 according to a second embodiment. Each functional block illustrated in FIG. 7 is realized by the CPU 11 of the automatic path generation device 1 illustrated in FIG. 1 and the processor 101 of the machine learning device 100 executing the respective system programs of the CPU 11 and the processor 101 and controlling the operation of each unit of the automatic path generation device 1 and the machine learning device 100.

In the estimation mode, the automatic path generation device 1 of the present embodiment estimates the actual motion path based on the temporary motion path data 54. The automatic path generation device 1 controls the robot 2 based on the estimated actual motion path. The control unit 30 in the automatic path generation device 1 according to the present embodiment is similar in function to the control unit 30 in the automatic path generation device 1 according to the first embodiment.

The motion path estimation unit 40 performs actual motion path estimation using the learned model stored in the learning model storage unit 46 based on the temporary motion path data 54 acquired via an external device such as a USB device (not illustrated) or a wired/wireless network (not illustrated). As for the motion path estimation unit 40 of the present modification example, the learned model is the (parameter-determined) neural network generated by the supervised learning conducted by the motion path learning unit 38. The motion path estimation unit 40 estimates (calculates) the actual motion path by inputting the temporary motion path data 54 as input data to the learned model. The actual motion path estimated by the motion path estimation unit 40 is output to the control unit 30 and used for the robot 2 to be controlled. In addition, the actual motion path estimated by the motion path estimation unit 40 may be used after, for example, display output to the display device 70 or transmission output to a host computer, a cloud computer, or the like via a wired/wireless network (not illustrated).

The automatic path generation device 1 of the present embodiment configured as described above performs motion path learning based on a plurality of teacher data obtained by the robot 2 performing motions of various patterns. The automatic path generation device 1 estimates an efficient motion path of the robot 2 by using a learned model in which a sufficient learning result is obtained.

Figure 8:
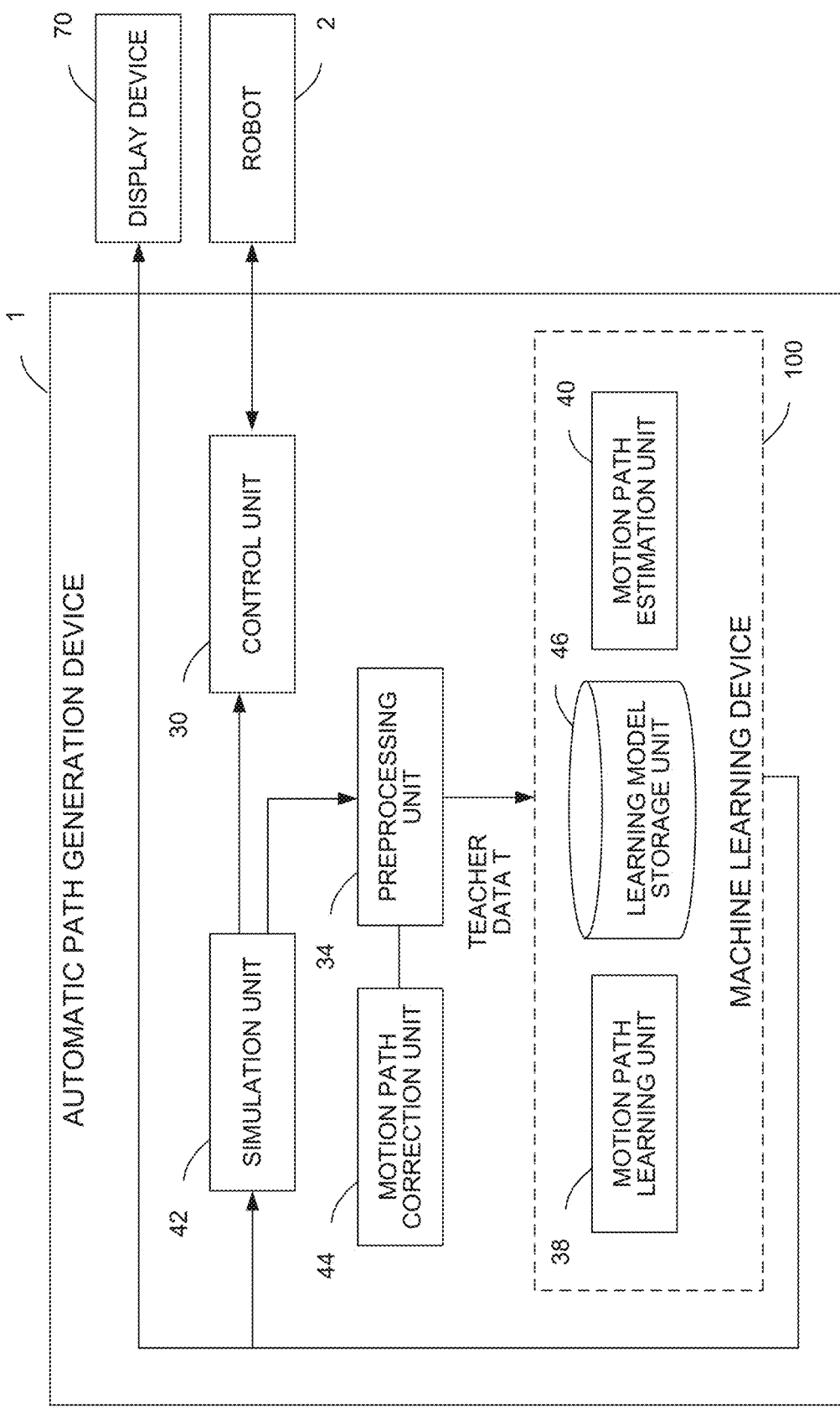
FIG. 8 is a schematic functional block diagram of an automatic path generation device according to a third embodiment.

FIG. 8 is a schematic functional block diagram in the estimation mode of the machine learning device 100 of the automatic path generation device 1 according to a third embodiment. The function of each functional block illustrated in FIG. 8 is realized by the CPU 11 of the automatic path generation device 1 illustrated in FIG. 1 and the processor 101 of the machine learning device 100 executing the respective system programs of the CPU 11 and the processor 101 and controlling the operation of each unit of the automatic path generation device 1 and the machine learning device 100. The control program 50, the CAD data 52, the temporary motion path data 54, and the like are not illustrated in FIG. 8.

The automatic path generation device 1 of the present embodiment includes a simulation unit 42 simulating the motion of the robot 2. The simulation unit 42 performs the simulation using the actual motion path that the motion path estimation unit 40 estimates based on the temporary motion path data 54 in the estimation mode. As a result of the motion simulation by the simulation unit 42, interference may occur between the robot 2 or the welding tool and the workpiece or the jig on the estimated actual motion path. In this case, a motion path correction unit 44 changes the position of the midpoint of the estimated actual motion path or the like to a position where no interference occurs between the robot 2 or the welding tool and the workpiece or the jig (such as a position away by a predetermined distance set in advance from the object of interference). The changed actual motion path is input to the preprocessing unit 34. The preprocessing unit 34 creates new teacher data T with the input actual motion path and the temporary motion path used for the actual motion path estimation. The new teacher data T is used for relearning with respect to the learned model.

The automatic path generation device 1 of the present embodiment corrects the actual motion path such that no interference occurs in a case where interference occurs on the estimated actual motion path. The automatic path generation device 1 constructs a more appropriate learned model by performing relearning by using the corrected actual motion path.

Although embodiments of the present disclosure have been described above, the present disclosure is not limited to the examples of the embodiments described above and can be implemented in various aspects by being changed as appropriate.

For example, the learning and arithmetic algorithms executed by the machine learning device 100, the control algorithm executed by the automatic path generation device 1, and the like are not limited to those described above and various algorithms can be adopted.

According to the description of the embodiments described above, the automatic path generation device 1 and the machine learning device 100 are devices having different CPUs. Alternatively, the machine learning device 100 may be realized by the system program stored in the ROM 12 and the CPU 11 of the automatic path generation device 1.

In the embodiments exemplified above, the automatic path generation device 1 estimates the inter-hit point motion path in spot welding. The automatic path generation device 1 is capable of estimating a motion path at an air cut part in arc welding, laser welding, and the like as well. In other words, the automatic path generation device 1 is capable of estimating a motion path related to a welding tool movement between preceding and subsequent welding processes.

Also possible is application to automatic path generation for general robots. For example, in a handling robot (transport robot), the position of the motion point is a workpiece gripping position, a pre-workpiece transport position, or the like. In the handling robot, the interference object is, for example, another device present on a transport path. The automatic path generation device 1 estimates, for example, a motion path until workpiece gripping and a motion path during the workpiece movement to a movement destination that is subsequent to the workpiece gripping. In other words, the automatic path generation device 1 learns an efficient actual motion path created by a skilled worker corresponding to the temporary motion path automatically generated by the motion planning algorithm or the like and estimates an efficient actual motion path from the temporary motion path automatically generated by the motion planning algorithm or the like by using the result of the learning.

The invention claimed is:

1. An automatic path generation device for a robot, the automatic path generation device comprising:
    a motion path learning unit configured to learn a neural network for estimating an actual motion path from a temporary motion path according to teacher data created based on (i) the temporary motion path created based on a plurality of motion points for the robot and CAD data including virtual shape information, and (ii) the actual motion path created by a worker;
    a preprocessing unit configured to, in response to the actual motion path having a section not being substantially straight,
        assume an interference object at a position of a predetermined distance from the section of the actual motion path, and
        generate the temporary motion path based on the interference object; and
    a control unit configured to control the robot based on an output from the neural network in response to an input of at least the temporary motion path into the neural network.

2. The automatic path generation device according to claim 1, wherein the preprocessing unit is configured to extract the actual motion path from a control program created by the worker.

3. The automatic path generation device according to claim 2, wherein the preprocessing unit is configured to generate the temporary motion path by
    extracting a motion point of the plurality of motion points from the control program, and
    using the extracted motion point and the virtual shape information on the interference object in a motion environment of the robot.

4. The automatic path generation device according to claim 3, wherein the virtual shape information on the interference object in the motion environment of the robot is estimated based on the actual motion path extracted from the control program.

5. An automatic path generation device for a robot, the automatic path generation device comprising:
    a learning model storage unit storing a neural network which has been learnt to estimate an actual motion path from a temporary motion path according to teacher data created based on (i) the temporary motion path created based on a plurality of motion points for the robot and CAD data including virtual shape information and (ii) the actual motion path created by a worker, wherein
        in response to the actual motion path having a section not being substantially straight,
            an interference object is assumed at a position of a predetermined distance from the section of the actual motion path, and
            the temporary motion path is generated based on the interference object;
    a motion path estimation unit configured to estimate the actual motion path for the robot based on an output from the neural network in response to an input of at least the temporary motion path into the neural network; and
    a control unit configured to control the robot based on the estimated actual motion path.

6. The automatic path generation device according to claim 5, further comprising:
    a simulation unit configured to simulate a motion of the robot based on the actual motion path of the robot estimated by the motion path estimation unit; and
    a motion path correction unit configured to correct the actual motion path in a case where the robot interferes with an interference object as a result of the simulation such that the interference does not occur,
wherein relearning of the learned model is performed based on the actual motion path corrected by the motion path correction unit.

7. An automatic path generation device, comprising:
at least one processor configured to
  learn a neural network for estimating an actual motion path from a temporary motion path according to teacher data created based on (i) the temporary motion path created based on a plurality of motion points for a robot and CAD data including virtual shape information, and (ii) the actual motion path created by a worker,
  in response to the actual motion path having a section not being substantially straight,
    assume an interference object at a position of a predetermined distance from the section of the actual motion path, and
    generate the temporary motion path based on the interference object, and
  control the robot based on an output from the neural network in response to an input of at least the temporary motion path into the neural network.

* * * * *